United States Patent
Sugimura et al.

(10) Patent No.: US 11,161,943 B2
(45) Date of Patent: Nov. 2, 2021

(54) PRODUCTION METHOD FOR POLY(VINYL ALCOHOL)

(71) Applicant: DENKA COMPANY LIMITED, Tokyo (JP)

(72) Inventors: Shin Sugimura, Itoigawa (JP); Takayuki Oshima, Itoigawa (JP)

(73) Assignee: Denka Company Limited, Toyko (JP)

( * ) Notice: Subject to any disclaimer, the term of this patent is extended or adjusted under 35 U.S.C. 154(b) by 0 days.

(21) Appl. No.: 16/627,661

(22) PCT Filed: Jul. 10, 2017

(86) PCT No.: PCT/JP2017/025142
§ 371 (c)(1),
(2) Date: Dec. 30, 2019

(87) PCT Pub. No.: WO2019/012581
PCT Pub. Date: Jan. 17, 2019

(65) Prior Publication Data
US 2020/0157289 A1     May 21, 2020

(51) Int. Cl.
*C08J 3/12*      (2006.01)

(52) U.S. Cl.
CPC ............. *C08J 3/12* (2013.01); *C08J 2329/04* (2013.01)

(58) Field of Classification Search
CPC ..... C08F 16/06; C08F 6/00; C08J 3/12; C08J 2329/04
See application file for complete search history.

(56) References Cited

U.S. PATENT DOCUMENTS

2010/0230521 A1* 9/2010 Butler ................ B29B 17/0404
241/33

FOREIGN PATENT DOCUMENTS

| JP | 55099925 A | * | 7/1980 |
| JP | S61-046241 A | | 3/1986 |
| JP | H2-225506 A | | 9/1990 |
| JP | 05339380 A | * | 12/1993 |
| JP | H5-339380 A | | 12/1993 |
| JP | H8-301936 A | | 11/1996 |
| JP | H9-302024 A | | 11/1997 |
| JP | 2003-055889 A | | 2/2003 |
| JP | 2004-315345 A | | 11/2004 |
| JP | 2006-028233 A | | 2/2006 |
| JP | 2015-025211 A | | 2/2015 |

OTHER PUBLICATIONS

Japan Patent Office, International Search Report in International Application No. PCT/2017/025142 (dated Sep. 5, 2017).
Japan Patent Office, Written Opinion in International Application No. PCT/2017/025142 (dated Sep. 5, 2017).
International Bureau of WIPO, International Preliminary Report on Patentability in International Application No. PCT/2017/025142 (dated Jan. 14, 2020).
European Patent Office, Extended European Search Report in European Patent Application No. 17917781.1 (dated Mar. 17, 2020).

* cited by examiner

*Primary Examiner* — Mark S Kaucher

(74) *Attorney, Agent, or Firm* — Leydig, Voit & Mayer, Ltd.

(57) ABSTRACT

Disclosed is a production method for a poly(vinyl alcohol) having a degree of saponification of 97.0 mol % or more, comprising: a pulverization step of pulverizing a first poly(vinyl alcohol) having a particulate form to obtain a second poly(vinyl alcohol) having an adjusted particle size, and a heating step of heating the second poly(vinyl alcohol).

6 Claims, No Drawings

PRODUCTION METHOD FOR POLY(VINYL ALCOHOL)

CROSS-REFERENCE TO A RELATED APPLICATION

This patent application is the U.S. national phase of International Application No. PCT/JP2017/025142, filed on Jul. 10, 2017, the disclosure of which is incorporated herein by reference in its entirety for all purposes.

TECHNICAL FIELD

The present invention relates to a production method for a poly(vinyl alcohol).

BACKGROUND ART

In recent years, the use of inorganic fiber paper or chemical synthetic fiber paper, which is a type of nonwoven fabric produced from chemical synthetic fibers or inorganic fibers by a paper making method, has increased in various fields. Examples of the inorganic fiber paper include glass paper which is a nonwoven fabric made from glass fiber. Glass paper is generally produced by a method including a paper making step of spreading a slurry containing glass fibers and a particulate poly(vinyl alcohol) (hereinafter, also simply referred to as "poly(vinyl alcohol)") as an internal binder into a sheet form. In the case where a glass paper is produced by this method, a poly(vinyl alcohol) having a high degree of saponification is used. In addition, in order to maintain the strength and the surface smoothness of the glass paper, the particle size, the solubility in cold water, the degree of swelling, etc. of the poly(vinyl alcohol) need to be adjusted to a desired range.

A particulate poly(vinyl alcohol) is productized by separating a mother liquid from a solution containing a poly(vinyl alcohol) obtained by polymerization of a vinyl ester such as vinyl acetate and saponification of the polyvinyl ester, drying the poly(vinyl alcohol), and then pulverizing the dried poly(vinyl alcohol) (for example, Patent Literature 1).

CITATION LIST

Patent Literature

Patent Literature 1: Japanese Unexamined Patent Publication No. 2006-28233

SUMMARY OF INVENTION

Technical Problem

In the conventional production method, however, adjustment to a desired particle size of poly(vinyl alcohol) by pulverizing results in significant increase in the solubility in cold water and the degree of swelling, so that it is difficult to obtain a poly(vinyl alcohol) (suitable for use in glass paper or the like) satisfying all of the particle size, the solubility in cold water and the degree of swelling in parallel.

An object of the present invention is, therefore, to provide a production method for a poly(vinyl alcohol) enabling all of the particle size, the solubility in cold water and the degree of swelling to be adjusted to a desired range.

Solution to Problem

The production method for a poly(vinyl alcohol) of the present invention is a production method for a poly(vinyl alcohol) having a degree of saponification of 97.0 mol % or more, comprising a pulverization step of pulverizing a first poly(vinyl alcohol) having a particulate form to obtain a second poly(vinyl alcohol) having an adjusted particle size, and a heating step of heating the second poly(vinyl alcohol).

According to the production method, all of the particle size, the solubility in cold water, and the degree of swelling of a poly(vinyl alcohol) can be adjusted to a desired range. Specifically, in the production method, the particle size of a poly(vinyl alcohol) is adjusted to a desired range in a pulverization step, and the solubility in cold water and the degree of swelling of the poly(vinyl alcohol) increased by the pulverization step can be reduced in a heating step for adjustment to a desired range.

The heating step may be a step in which the second poly(vinyl alcohol) is heated after at least one of an alcohol and water is adhered to a surface of the second poly(vinyl alcohol). Adhering an alcohol or water to the surface of the second poly(vinyl alcohol) enables the solubility in cold water and the degree of swelling to be adjusted in a shorter time.

The heating step may be a step in which the second poly(vinyl alcohol) is heated after an alcohol and water are adhered to a surface of the second poly(vinyl alcohol). Adhering an alcohol and water to the surface of the second poly(vinyl alcohol) enables the solubility in cold water and the degree of swelling to be adjusted in a shorter time.

The pulverization step may be a step in which the first poly(vinyl alcohol) is pulverized such that a proportion of a poly(vinyl alcohol) having a particle diameter of 53 μm or less in the second poly(vinyl alcohol) is 50 mass % or less, and that a proportion of a poly(vinyl alcohol) having a particle diameter of 180 μm or more in the second poly(vinyl alcohol) is 5 mass % or less. Through adjustment of the particle size of the second poly(vinyl alcohol) in such a manner in the pulverization step, for example, a poly(vinyl alcohol) useful as a binder to obtain products such as a glass paper excellent in the strength and the surface smoothness can be produced.

The poly(vinyl alcohol) having a degree of saponification of 97.0 mol % or more may have a solubility in cold water of 10.0% or less and a degree of swelling of 5.0 or less.

The poly(vinyl alcohol) having a degree of saponification of 97.0 mol % or more may be used as a binder for glass paper.

Advantageous Effects of Invention

According to the present invention, a production method for a poly(vinyl alcohol) can be provided, enabling all of the particle size, the solubility in cold water and the degree of swelling to be adjusted to a desired range.

DESCRIPTION OF EMBODIMENTS

Embodiments of the present invention are described in detail as follows. The present invention is not limited to the following embodiments.

A production method for a poly(vinyl alcohol) of the present embodiment comprises a pulverization step of pulverizing a first poly(vinyl alcohol) having a particulate form to obtain a second poly(vinyl alcohol) having an adjusted particle size, and a heating step of heating the second poly(vinyl alcohol).

The pulverization step is a step of pulverizing a first poly(vinyl alcohol) having a particulate form to obtain a second poly(vinyl alcohol) having an adjusted particle size.

The first poly(vinyl alcohol) may be prepared by saponifying all or part of a polyvinyl ester obtained by polymerization of a vinyl ester, or may be a commercially available poly(vinyl alcohol).

The polyvinyl ester may be a homopolymer of a vinyl ester, or a copolymer of a vinyl ester and a monomer other than a vinyl ester, copolymerizable with the vinyl ester, and in view of stability of the first poly(vinyl alcohol), a homopolymer of a vinyl ester is preferred.

The vinyl ester may be, for example, vinyl acetate, vinyl propionate, vinyl propionate, vinyl valerate, vinyl caprate, vinyl laurate, vinyl stearate, vinyl benzoate, vinyl pivalate, etc., and in view of easiness of polymerization, vinyl acetate is preferred.

The monomer other than a vinyl ester, copolymerizable with a vinyl ester may be, for example, α-olefin monomers such as ethylene and propylene; alkyl (meth)acrylate ester monomers such as methyl (meth)acrylate, ethyl (meth)acrylate, butyl (meth)acrylate and 2-ethylhexyl (meth)acrylate; unsaturated amide monomers such as (meth)acrylamide and N-methylol acrylamide; unsaturated carboxylic acid monomers such as (meth)acrylic acid, crotonic acid, maleic acid, itaconic acid and fumaric acid; alkyl (methyl, ethyl, propyl, etc.) ester monomers of unsaturated carboxylic acids; anhydrides of unsaturated carboxylic acids such as maleic anhydride; salts of unsaturated carboxylic acids with sodium, potassium, ammonium, etc.; glycidyl group-containing monomers such as allyl glycidyl ether and glycidyl (meth) acrylate; sulfonic acid group-containing monomers such as 2-acrylamide-2-methylpropane sulfonic acid or salts thereof; phosphate group-containing monomers such as acid phosphooxyethyl methacrylate and acid phosphooxypropyl methacrylate; and alkyl vinyl ether monomers.

In polymerization of vinyl esters, a polymerization initiator may be used. The polymerization initiator may be, for example, a radical polymerization initiator. The radical polymerization initiator may be azo compounds such as azobisisobutyronitrile and azobisdimethylvaleronitrile, organic peroxides such as benzoyl peroxide and dicumyl peroxide, inorganic peroxides such as potassium persulfate, and redox polymerization initiators such as cerium(IV) salt-alcohol.

The polymerization method of vinyl esters may be a known polymerization method such as a solution polymerization, a suspension polymerization and a bulk polymerization, and a solution polymerization is preferred due to easiness of operation. Also, the polymerization method of vinyl esters is preferably a solution polymerization in alcohol, because the solvent can be commonly used for the subsequent saponification reaction. In the case of solution polymerization, the polymerization reaction temperature is preferably 30° C. or more and may be 90° C. or less.

The saponification is performed by dissolving a polyvinyl ester obtained by polymerization in alcohol to prepare an alcohol solution for an ester exchange reaction (alcoholysis) between the ester in the molecule and alcohol in the presence of an alkali catalyst or an acid catalyst.

Examples of the alcohol as a solvent for the saponification reaction include methanol, ethanol, propanol and butanol. The concentration of the polyvinyl ester in the alcohol solution may be, for example, 10 mass % or more and 80 mass % or less. The reaction temperature of the saponification may be, for example, 10° C. or more or 30° C. or more, and 70° C. or less or 40° C. or less. The reaction time of the saponification may be, for example, 30 minutes or more and 3 hours or less.

The alkali catalyst may be, for example, hydroxides of an alkali metal such as sodium hydroxide and potassium hydroxide. The acid catalyst may be, for example, an aqueous solution of inorganic acids such as hydrochloric acid and sulfuric acid, or an organic acid such as p-toluenesulfonic acid. The amount of these catalysts used may be, for example, 1 mmol equivalent or more and 100 mmol equivalents or less relative to the polyvinyl ester.

The degree of saponification of the first poly(vinyl alcohol) is, for example, preferably 97.0 mol % or more, more preferably 97.5 mol % or more, still more preferably 98.0 mol % or more, furthermore preferably 98.5 mol % or more, particularly preferably 99.0 mol % or more.

Generally, as the degree of saponification increases, the solubility of poly(vinyl alcohol) in water decreases. In the case where a poly(vinyl alcohol) is used as a binder for glass paper, it is preferable that the degree of saponification be set high (for example, 99.0 mol % or more) to prevent the poly(vinyl alcohol) from falling down together with water during spreading of glass fibers into a paper form from slurry in a paper making process. However, according to the production method of the present embodiment, the solubility in cold water can be lowered by adjustment of the solubility in cold water, so that even a poly(vinyl alcohol) having a relatively low degree of saponification can be used as the first poly(vinyl alcohol).

The "degree of saponification" herein refers to a value calculated based on the measurement in accordance with JIS K 6726 "3.5 Degree of saponification."

The degree of saponification may be quickly and accurately calculated using a near infrared analyzer. For example, first, near infrared absorption spectra of standard samples of a plurality of poly(vinyl alcohol)s having specified degrees of saponification are measured, and a calibration curve is made from the measurement results through multiple regression analysis, a principal component regression analysis method, a partial least square method, etc., so that the degree of saponification of a target poly(vinyl alcohol) can be measured. According to the measurement method using a near infrared analyzer, it is also possible to measure the degree of saponification of a poly(vinyl alcohol) in a production process.

The method of saponifying a polyvinyl ester may be a conventional method such as a belt-saponification method and a kneader-saponification method, and in view of easiness of production, a belt-saponification method is preferred.

The viscosity average degree of polymerization of the first poly(vinyl alcohol) may be 100 or more, 700 or more, or 1000 or more, and may be 10000 or less, 6000 or less, or 4000 or less.

The "viscosity average degree of polymerization" herein is calculated from the intrinsic viscosity [η] (g/dL) measured at 30° C. with an Ostwald viscometer using ion exchange water as a solvent, based on the following formula (1).

$$\log(P) = 1.613 \times \log([\eta] \times 10^4/8.29) \tag{1}$$

Here, P represents the viscosity average degree of polymerization.

The first poly(vinyl alcohol) may contain a poly(vinyl alcohol) having a large particle diameter. The proportion of a poly(vinyl alcohol) having a particle diameter of 180 μm or more in the first poly(vinyl alcohol) may be 5 mass % or more, 10 mass % or more, 20 mass % or more, or 50 mass % or more. The proportion of a poly(vinyl alcohol) having a particle diameter of 53 µm or less in the first poly(vinyl alcohol) may be 5 mass % or less, or may be 0 mass % (containing no poly(vinyl alcohol) having a particle diameter of 53 µm or less).

Herein, the proportion of a poly(vinyl alcohol) having a particle diameter of 180 µm or more refers to the proportion of a poly(vinyl alcohol) remaining on a sieve (product on sieve) on mass basis, when a poly(vinyl alcohol) as a measurement target (for example, the first poly(vinyl alcohol)) is sieved with a test sieve (nominal opening: 180 µm) described in JIS Z 8801-1: 2006, i.e., (mass of product on sieve/total mass of poly(vinyl alcohol) as measurement target). Herein, the proportion of a poly(vinyl alcohol) having a particle diameter of 53 µm or less refers to the proportion of a poly(vinyl alcohol) falling through a sieve (product under sieve) on mass basis, when a poly(vinyl alcohol) as a measurement target (for example, the first poly(vinyl alcohol)) is sieved with a test sieve (nominal opening: 53 µm) described in JIS Z 8801-1: 2006, i.e., (mass of product under sieve/total mass of poly(vinyl alcohol) as measurement target).

The solubility of the first poly(vinyl alcohol) in cold water may be 2.0% or more, 3.0% or more, 5.0% or more, or 10.0% or more.

The "solubility in cold water" herein refers to the solubility in water at 20.0° C. More specifically, 10.0 g (dry mass) of a poly(vinyl alcohol) is added to 240.0 g of pure water at 20.0° C. and stirred for 15 minutes, and the mixture is then left standing still for 60 minutes to collect the supernatant with a 10-mL pipette, which is dried at 150° C. for 45 minutes for measurement of the solid content of the supernatant to calculate the concentration of the aqueous solution. The proportion of the mass of poly(vinyl alcohol) dissolved in water, which is converted from the concentration of the aqueous solution, to the dry mass of the initial poly(vinyl alcohol) is taken as the solubility in cold water.

[Solubility in cold water](%)=[mass of dissolved poly(vinyl alcohol)]/[dry mass of initial poly(vinyl alcohol)]×100

The degree of swelling of the first poly(vinyl alcohol) may be 10.0 or less, 5.0 or less, or less than 2.0.

The "degree of swelling" herein is obtained as follows. To 240.0 g of pure water at 20.0° C., 10.0 g (dry mass) of a poly(vinyl alcohol) is added and stirred for 15 minutes, and then stirring is stopped to leave the mixture standing still for 60 minutes. Then, the mass of poly(vinyl alcohol) in a swollen state collected by filtration with a Buchner funnel equipped with No. 5A filter paper is measured. The ratio of the mass to the dry mass of initial poly(vinyl alcohol) is taken as the degree of swelling.

[Degree of swelling]=[mass of poly(vinyl alcohol) in wet state collected by filtration]/[dry mass of initial poly(vinyl alcohol)]

Examples of the pulverization method for pulverizing the first poly(vinyl alcohol) include a wet method in which poly(vinyl alcohol) in a slurry state containing a mother liquid for saponification is pulverized and a dry method in which after removal of the mother liquid from the slurry, the resulting poly(vinyl alcohol) is pulverized and dried. Since the particle size of the first poly(vinyl alcohol) can be more easily controlled, the pulverization step is preferably a step of pulverizing the first poly(vinyl alcohol) having a particulate form by a dry method to obtain the second poly(vinyl alcohol) having an adjusted particle size.

As a pulverizer, known pulverizers can be used, and examples thereof include ACM Pulverizer and Fine Impact Mill manufactured by Hosokawa Micron Corporation, Free Pulverizer manufactured by Nara Machinery Co., Ltd., Turbo Mill and Turbo Disk Mill manufactured by Freund-Turbo Corporation, and HID series manufactured by Orenda Pulverizers Inc.

In the pulverization step, the first poly(vinyl alcohol) may be pulverized such that the proportion of poly(vinyl alcohol) having a particle diameter of 53 µm or less in the second poly(vinyl alcohol) is 50 mass % or less and that the proportion of poly(vinyl alcohol) having a particle diameter of 180 µm or more in the second poly(vinyl alcohol) is 5 mass % or less.

The proportion of poly(vinyl alcohol) having a particle diameter of 53 µm or less in the second poly(vinyl alcohol) is more preferably 30 mass % or less, still more preferably 28 mass % or less, furthermore preferably 20 mass % or less, particularly preferably 10 mass % or less. The proportion of poly(vinyl alcohol) having a particle diameter of 180 µm or more in the second poly(vinyl alcohol) is more preferably 3 mass % or less, still more preferably 2 mass % or less, particularly preferably 1 mass % or less.

The particle size of the second poly(vinyl alcohol) can be adjusted, for example, by pulverizing part or all of the first poly(vinyl alcohol). In the case where part of the first poly(vinyl alcohol) is pulverized, for example, the first poly(vinyl alcohol) may be sieved to fractionate a poly(vinyl alcohol) having a particle diameter of 180 µm or more, and then the fractionated poly(vinyl alcohol) having a particle diameter of 180 µm or more may be pulverized to adjust the particle size of the second poly(vinyl alcohol). In the case where the proportion of the poly(vinyl alcohol) having a particle diameter of 53 µm or less is large, the first poly(vinyl alcohol) may be sieved to fractionate poly(vinyl alcohol) having a particle diameter of 53 µm or less, and then part or all of the fractionated poly(vinyl alcohol) having a particle diameter of 53 µm or less may be removed to adjust the particle size of the second poly(vinyl alcohol).

The volatile content of the first poly(vinyl alcohol) is, for example, preferably 5.0 mass % or less, more preferably 4.0 mass % or less, still more preferably 3.0 mass % or less, based on the total mass of the first poly(vinyl alcohol). Here, the "volatile content" refers to a volatile content measured and calculated according to the description in "3.4 Volatile content" in JIS K 6726-1994, including, for example, solvent components such as methanol used in the production of the first poly(vinyl alcohol). Through adjustment of the volatile content to the range described above, the pulverization step can be more safely performed.

The volatile content may be adjusted by drying the first poly(vinyl alcohol). In other words, the production method for a poly(vinyl alcohol) of the present embodiment may further comprise a drying step of drying the first poly(vinyl alcohol) before the pulverization step, and the volatile content of the first poly(vinyl alcohol) may be adjusted to the range described above in the drying step.

The drying method in the drying step may be natural drying or forced drying using a drying facility, and a forced drying method using a drying facility is preferred. It is preferable that the drying temperature be lower than the temperature at which the first poly(vinyl alcohol) is thermally damaged. The drying temperature is preferably 180° C. or less, more preferably 150° C. or less, still more preferably 120° C. or less. The drying temperature is, for example, preferably 70° C. or more, more preferably 80° C.

or more, still more preferably 90° C. or more. The drying time is appropriately selected according to the drying temperature and the like.

A heating step is a step of heating the second poly(vinyl alcohol).

The heating temperature in the heating step may be adjusted to obtain an intended solubility in cold water and an intended degree of swelling of the poly(vinyl alcohol). In view of preventing thermal deterioration of the second poly(vinyl alcohol), the upper limit of the heating temperature is preferably 180° C. or less, more preferably 150° C. or less, still more preferably 120° C. or less. In view of controlling the solubility in cold water and the degree of swelling, and of reducing the heating time, the lower limit of the heating temperature is preferably 70° C. or more, more preferably 80° C. or more, still more preferably 90° C. or more. The heating temperature can be adjusted within the range, and may be, for example, 70 to 180° C., 80 to 150° C., or 90 to 120° C. The heating time is appropriately selected according to the heating temperature and the like.

It is preferable that the heating step be a step of heating the second poly(vinyl alcohol) after adhering at least one of an alcohol and water to the surface of the second poly(vinyl alcohol). Heating after adherence of the alcohol or water to the surface of the second poly(vinyl alcohol) enables control of the solubility in cold water and the degree of swelling to be more efficiently achieved. It is considered that the adherence of the alcohol or water causes the second poly(vinyl alcohol) to be partially dissolved, resulting in easy occurrence of changes in degree of crystallinity and the like by heating. The heating step is preferably, for example, a step of heating the second poly(vinyl alcohol) after adhering at least one of the alcohol and water to the surface of the second poly(vinyl alcohol), and is more preferably a step of heating the second poly(vinyl alcohol) after adhering the alcohol and water to the surface of the second poly(vinyl alcohol).

The method for adhering at least one of alcohol and water to the surface of the second poly(vinyl alcohol) may be a method such as spraying, coating and dipping, and an adhesion method by spraying is preferred due to easy control of the amount of at least one of alcohol and water adhered to the second poly(vinyl alcohol) and easy operation.

In the case where alcohol is adhered to the second poly(vinyl alcohol), it is preferable that the heating step be performed under an atmosphere of inert gas such as nitrogen in view of safety.

The alcohol is preferably an alcohol having solubility in water such as methanol, ethanol, propyl alcohol, butanol and ethylene glycol. Among these alcohols, methanol is preferred in view of easiness in use, economy, etc.

The amount of at least one of the alcohol and water adhered is preferably 0.01 mass % or more, more preferably 0.1 mass % or more, still more preferably 0.5 mass % or more, based on the total mass of the second poly(vinyl alcohol). The amount of at least one of alcohol and water adhered is preferably 10 mass % or less, more preferably 5.0 mass % or less, still more preferably 2.0 mass % or less, based on the total mass of the second poly(vinyl alcohol). With the amount adhered controlled to the range, the heating time can be reduced, and the occurrence of aggregates formed from the second poly(vinyl alcohol) fused to each other can be further prevented.

In the heating step, the alcohol and water each may be used alone, or the alcohol and water may be mixed for use. In view of more efficient achievement of control of the solubility in cold water and the degree of swelling, it is preferable that the alcohol and water be mixed for use. In the case of using water alone, in view of further preventing the occurrence of aggregates of particles formed by partial dissolution of the second poly(vinyl alcohol), it is preferable that a method be devised such that the particles are disposed not to come in contact with each other and then brought into contact with water.

In the case where alcohol and water are mixed for use, the content of water is preferably 1 mass % or more, more preferably 5 mass % or more, still more preferably 10 mass % or more, based on the total mass of alcohol and water. In the case where alcohol and water are mixed for use, the content of water is preferably 50 mass % or less, more preferably 30 mass % or less, still more preferably 25 mass % or less, based on the total mass of alcohol and water.

The poly(vinyl alcohol) obtained by the production method in the present embodiment may have the following properties.

The degree of saponification of the poly(vinyl alcohol) is 97.0 mol % or more, and may be 97.5 mol % or more, 98.0 mol % or more, 98.5 mol % or more, or 99.0 mol % or more. The degree of saponification of the poly(vinyl alcohol) can be controlled by adjusting the degree of saponification of the first poly(vinyl alcohol).

The solubility of the poly(vinyl alcohol) in cold water is preferably 10.0% or less, more preferably 9.0% or less, still more preferably 8.0% or less. The solubility of the poly(vinyl alcohol) in cold water may be 0.0% or more, 0.5% or more, or 1.0% or more. With a solubility of the poly(vinyl alcohol) in cold water in the range, when a slurry mixed with fibers such as inorganic fibers and chemical synthetic fibers is prepared and the fibers are spread into a sheet form in a paper making process, the poly(vinyl alcohol) can be prevented from falling down together with water, resulting in more sufficient strength of a product to be obtained, which is preferable. The solubility in cold water can be adjusted by controlling the degree of pulverization in the pulverization step and the heating temperature and heating time in the heating step.

The degree of swelling of the poly(vinyl alcohol) is preferably 5.0 or less, more preferably 4.0 or less, still more preferably 3.4 or less. The degree of swelling of the poly(vinyl alcohol) is preferably 2.0 or more, more preferably 2.5 or more, still more preferably 2.7 or more. The degree of swelling of the poly(vinyl alcohol) can be adjusted in the range, and may be, for example, 2.0 to 5.0, 2.5 to 5.0, 2.7 to 5.0, or 2.7 to 3.4. With the upper limit of the degree of swelling of the poly(vinyl alcohol) controlled to the range, a moderate space can be secured when fibers such as inorganic fibers and chemical synthetic fibers are fastened to each other, so that more excellent air permeability of a product is achieved. With the lower limit of the degree of swelling of the poly(vinyl alcohol) controlled to the range, fibers such as inorganic fibers and chemical synthetic fibers can be more sufficiently fastened to each other, so that the strength of a resulting product can be further improved. The degree of swelling can be adjusted by controlling the degree of pulverization in the pulverization step and the heating temperature and heating time in the heating step.

The proportion of particles having a particle diameter of 53 µm or less in the poly(vinyl alcohol) is preferably 50% or less, more preferably 40% or less, still more preferably 35% or less. The proportion of particles having a particle diameter of 180 µm or more in the poly(vinyl alcohol) is preferably 5% or less, more preferably 3% or less, still more preferably 1% or less. The particle size of the poly(vinyl alcohol) can be adjusted in the range, and, for example, the proportion of particles having a particle diameter of 53 µm or less may be 50% or less and the proportion of particles having a particle diameter of 180 µm or more may be 5% or less, the proportion of particles having a particle diameter of 53 µm or less may be 40% or less and the proportion of particles having a particle diameter of 180 µm or more may be 3% or less, or the proportion of particles having a particle diameter of 53 µm or less may be 35% or less and the proportion of particles having a particle diameter of 180 µm or more may be 1% or less.

With the proportion of particles of poly(vinyl alcohol) having a particle diameter of 53 µm or less controlled to the range, the poly(vinyl alcohol) can be prevented from falling down together with water when a slurry mixed with fibers such as inorganic fibers and chemical synthetic fibers is prepared and framed into a sheet form, resulting in more sufficient strength of a product to be obtained. Also, with the proportion of particles of poly(vinyl alcohol) having a particle diameter of 180 µm or more controlled to the range in the particle size distribution, the surface state of a product can be smoother, and the air permeability of a product can be further improved.

The aspect ratio of the poly(vinyl alcohol) may be, for example, 3.0 or less, 2.0 or less, 1.5 or less, or 1.0. For example, in the case of using as a binder for glass paper, it is deemed that use of a poly(vinyl alcohol) having a particulate form having a large aspect ratio is desired, because use of a poly(vinyl alcohol) having a small aspect ratio causes the poly(vinyl alcohol) to easily fall down together with water when glass fibers are spread into a paper form in a paper making process. The poly(vinyl alcohol) obtained by the production method of the present embodiment, however, allows the solubility in cold water and the degree of swelling to be controlled, so that the poly(vinyl alcohol) can be sufficiently compounded between glass fibers when glass fibers are formed into a paper form in a paper making process.

Herein, the "aspect ratio" refers to a value measured using a particle size/shape distribution measuring apparatus (manufactured by Seishin Enterprise Co., Ltd., trade name "PITA-1"), and a value obtained by dividing the maximum length of an object by the maximum vertical length. Using methanol as a dispersion medium, the shape and the number of objects are determined, and the aspect ratio for the frequency average of the found number can be taken as the number average aspect ratio. Here, the number of measurements is set to 2900 to 3100.

According to the production method of the present embodiment, all of the particle size, the solubility in cold water and the degree of swelling can be adjusted to a desired range. According to the present embodiment, therefore, a poly(vinyl alcohol) useful as, for example, a binder (in particular, internal binder) used for inorganic fiber paper, chemical synthetic fiber paper, etc., can be obtained.

Conventionally, products of poly(vinyl alcohol) are produced by drying a poly(vinyl alcohol) obtained by saponification, and then pulverizing the dried product. The pulverization of the particles of poly(vinyl alcohol) for adjustment of the particle size of poly(vinyl alcohol) results in significant increase in the solubility in cold water and the degree of swelling, so that it is difficult to obtain a poly(vinyl alcohol) having desirable physical properties through adjustment of particle size by pulverization. Although a means to reduce the solubility in cold water and the degree of swelling of poly(vinyl alcohol) in advance by sufficiently drying poly(vinyl alcohol) before pulverization, it is difficult to reduce as much as the increase in the solubility in cold water and the degree of swelling caused through pulverization.

It is considered that the significant increase in the solubility in cold water and the degree of swelling in water caused by pulverization of poly(vinyl alcohol) having a particulate form is caused by the following reason. The poly(vinyl alcohol) having a particulate form has a high crystalline region at the outer edge of the particles and a low crystalline region in the internal part of the particles, and when pulverized, the low crystalline region is exposed to the surface of the particles. Since the low crystalline region is more soluble or more swellable in water than the high crystalline region, it is considered that the solubility in cold water and the degree of swelling of the poly(vinyl alcohol) significantly increase after pulverization. On the other hand, in the production method of the present embodiment, since the degree of crystallization in the low crystalline region and the like exposed to the particle surface can be changed by heating the second poly(vinyl alcohol) after pulverization, it is presumed that the effect can be obtained.

The poly(vinyl alcohol) obtained by the production method of the present embodiment can be suitably used for a binder for glass paper, a binder for insulating board, a binder for inorganic building panel, etc.

The binder for glass paper containing the poly(vinyl alcohol) obtained by the production method of the present embodiment is particularly useful as a so-called internal binder. The "internal binder" is also referred to as a primary binder, being a component coexisting with glass fibers in the slurry solution when a glass paper is made.

The glass paper can be produced on an industrial scale by a wet internal binder method comprising dispersing glass fibers having a fiber length of several mm to several tens of mm and a primary binder in water to prepare a slurry, and spreading the slurry into a sheet form on a net in a paper making process. Using the poly(vinyl alcohol) obtained by the production method of the present embodiment, a glass pager can be used. The glass paper is obtained, for example, by a production method comprising:

(1) a step of preparing a slurry containing a binder for the glass paper as a primary binder;

(2) a sheet forming step of preparing a solution containing the slurry and glass fibers, subjecting the solution to a paper making process, and removing the solvent to form a sheet; and (3) a step of letting the resulting sheet pass through a solution containing a secondary binder and then removing the solvent to produce a glass paper.

As the secondary binder, the binder for glass paper described above may be used, or another binder may be used. Examples of another binder include binders such as poly(vinyl alcohol)s other than ones described above, styrene-butadiene resins, acrylic resins, styrene-acrylic resins, vinyl acetate-acrylic resins, and vinyl acetate-ethylene comonomers.

EXAMPLES

The present invention is specifically described with reference to Examples as follows. The present invention is not limited to the following Examples.

<Measurement of Solubility in Cold Water>

The solubility in cold water was measured by the following method.

To 240.0 g of pure water at 20.0° C., 10.0 g (dry mass) of poly(vinyl alcohol) to be measured was added and stirred for 15 minutes. The mixture was left standing still for 60 minutes, and a supernatant was collected with a 10-mL pipette and dried at 150° C. for 45 minutes for measurement of the solid content of the supernatant to calculate the concentration of aqueous solution. The proportion of the mass of the poly(vinyl alcohol) dissolved in water, which was converted from the concentration of the aqueous solution, to the dry mass of the initial poly(vinyl alcohol) was taken as the solubility in cold water.

[Solubility in cold water](%)=[mass of poly(vinyl alcohol) dissolved]/[dry mass of initial poly(vinyl alcohol)]×100

<Measurement of Degree of Swelling>

The degree of swelling was measured by the following method.

To 240.0 g of pure water at 20.0° C., 10.0 g (dry mass) of a poly(vinyl alcohol) to be measured was added, stirred for 15 minutes, and then left standing still for 60 minutes. The mass of the poly(vinyl alcohol) in a wet state collected by filtration with a Buchner funnel equipped with No. 5A filter paper is then measured. The ratio of the mass to the dry mass of initial poly(vinyl alcohol) was taken as the degree of swelling.

[Degree of swelling]=[mass of poly(vinyl alcohol) in wet state collected by filtration]/[dry mass of initial poly(vinyl alcohol)]

Example 1

In a reaction vessel equipped with a reflux condenser, a dropping funnel and a stirrer, 100 parts by mass of vinyl acetate, 17.0 parts by mass of methanol, and 0.02 mol % of azobisisobutyronitrile were placed, and polymerization was performed for 3.0 hours under the boiling point while stirring under a nitrogen stream. Subsequently, unreacted vinyl acetate was removed out of the polymerization system, so that a methanol solution of polyvinyl acetate having a degree of polymerization of 2175 (solid content concentration: 30.5 mass %) was obtained.

To the methanol solution of polyvinyl acetate obtained as described above, a methanol solution of sodium hydroxide (prepared to an equivalent of 2.5 mmol of sodium hydroxide relative to polyvinyl acetate) was added to perform a saponification reaction at 40° C. for 60 minutes. After completion of the reaction, a resulting wet cake was roughly pulverized (apparatus: explosion-proof transmission mill, pulverization conditions: at a rotational speed of 4000 rpm for 10 minutes), and the saponification reaction was stopped by addition of acetic acid. After removal of the reaction mother liquid by centrifugation, a first poly(vinyl alcohol) having a particulate form was obtained by drying in a gear oven at 120° C. for 50 minutes. The measurements of the degree of saponification, the solubility in cold water and the degree of swelling of the first poly(vinyl alcohol) showed that the degree of saponification was 98.1 mol %, the solubility in cold water was 5.1%, and the degree of swelling was 1.7. The viscosity average degree of polymerization of the first poly(vinyl alcohol) was 1700.

The first poly(vinyl alcohol) was sieved using a sieve with an opening of 180 μm. Using a pulverizer (Mini Speed Mill manufactured by Labonect K.K.: model number MS-05), the product on sieve was pulverized (pulverization conditions: at a rotational speed of 30000 rpm for 3 minutes) and thoroughly mixed with the product under sieve to prepare a second poly(vinyl alcohol) having an adjusted particle size. The proportion of particles having a particle diameter of 53 μm or less in the adjusted second poly(vinyl alcohol) was 28%, and the proportion of the particles having a particle diameter of 180 pin or more was 0.2%. The measurements of the solubility in cold water and the degree of swelling of the second poly(vinyl alcohol) showed that the solubility in cold water was 40.2% and the degree of swelling was 5.7.

The second poly(vinyl alcohol) thus obtained was heated in a gear oven at 130° C. for 4 hours to produce an objective poly(vinyl alcohol) with a yield of 98%. The measurements of the degree of saponification, the solubility in cold water and the degree of swelling of the poly(vinyl alcohol) showed that the degree of saponification was 98.1 mol %, the solubility in cold water was 8.8%, and the degree of swelling was 3.3. The results are shown in Table 1.

Example 2

To 100 parts by mass of the second poly(vinyl alcohol) obtained in Example 1, 5 parts by mass of methanol was sprayed, and heating was then performed in a gear oven at 120° C. for 2 hours to produce an objective poly(vinyl alcohol) with a yield of 98%. The measurements of the degree of saponification, the solubility in cold water and the degree of swelling of the poly(vinyl alcohol) showed that the degree of saponification was 98.1 mol %, the solubility in cold water was 5.9%, and the degree of swelling was 3.2. The results are shown in Table 1.

Example 3

To 100 parts by mass of the second poly(vinyl alcohol) obtained in Example 1, 5 parts by mass of a methanol solution containing 5% water with a mixing ratio of water/methanol of 5/95 was sprayed, and heating was then performed in a gear oven at 120° C. for 1 hour to produce an objective poly(vinyl alcohol) with a yield of 98%. The measurements of the degree of saponification, the solubility in cold water and the degree of swelling of the poly(vinyl alcohol) showed that the degree of saponification was 98.1 mol %, the solubility in cold water was 3.9%, and the degree of swelling was 2.8. The results are shown in Table 1.

Comparative Example 1

A poly(vinyl alcohol) was obtained in the same manner as in Example 1, except that no heating step was performed. The measurements of the degree of saponification, the solubility in cold water and the degree of swelling of the resulting poly(vinyl alcohol) showed that the degree of saponification was 98.1 mol %, the solubility in cold water was 40.2%, and the degree of swelling was 5.7. The results are shown in Table 1.

Comparative Example 2

To a methanol solution of polyvinyl acetate obtained in the same manner as in Example 1, a methanol solution of sodium hydroxide (prepared to an equivalent of 2.5 mmol of sodium hydroxide relative to polyvinyl acetate) was added to perform a saponification reaction at 40° C. for 60 minutes. After completion of the reaction, a resulting wet cake was roughly pulverized (apparatus: explosion-proof transmission mill, pulverization conditions: at a rotational speed of 4000 rpm for 10 minutes), and the saponification reaction was stopped by addition of acetic acid. After removal of the reaction mother liquid by centrifugation, a first poly(vinyl alcohol) having a particulate form was obtained by drying in a gear oven at 120° C. for 100 minutes. The measurements of the degree of saponification, the solubility in cold water and the degree of swelling of the first poly(vinyl alcohol) showed that the degree of saponification was 98.2 mol %, the solubility in cold water was 2.3%, and the degree of swelling was 1.6. The viscosity average degree of polymerization of the first poly(vinyl alcohol) was 1700.

The first poly(vinyl alcohol) thus obtained was sieved using a sieve with an opening of 180 μm. Using a pulverizer (Mini Speed Mill manufactured by Labonect K.K.: model number MS-05), the product on sieve was pulverized (pulverization conditions: at a rotational speed of 30000 rpm for 3 minutes) and thoroughly mixed with the product under sieve to prepare a poly(vinyl alcohol). The proportion of particles having a particle diameter of 53 μm or less in the poly(vinyl alcohol) was 32%, and the proportion of the particles having a particle diameter of 180 μm or more was 0.4%. The measurements of the solubility in cold water and the degree of swelling of the poly(vinyl alcohol) showed that the solubility in cold water was 28.6% and the degree of swelling was 5.4. The results are shown in Table 1.

TABLE 1

| | | Example 1 | Example 2 | Example 3 | Comp. Example 1 | Comp. Example 2 |
|---|---|---|---|---|---|---|
| First poly(vinyl alcohol) | Degree of saponification (mol %) | 98.1 | 98.1 | 98.1 | 98.1 | 98.2 |
| | Viscosity average degree of polymerization | 1700 | 1700 | 1700 | 1700 | 1700 |
| | Solubility in cold water (%) | 5.1 | 5.1 | 5.1 | 5.1 | 2.3 |
| | Degree of swelling | 1.7 | 1.7 | 1.7 | 1.7 | 1.6 |
| Second poly(vinyl alcohol) | Proportion of particles having a particle diameter of 180 μm or more (mass %) | 0.2 | 0.2 | 0.2 | 0.2 | 0.4 |
| | Proportion of particles having a particle diameter of 53 μm or less (mass %) | 28 | 28 | 28 | 28 | 32 |
| | Solubility in cold water (%) | 40.2 | 40.2 | 40.2 | 40.2 | 28.6 |
| | Degree of swelling | 5.7 | 5.7 | 5.7 | 5.7 | 5.4 |
| Condition for heating step | Solvent | — | Methanol | Methanol containing 5% water | — | — |
| | Amount of solvent sprayed (%) | — | 5 | 5 | — | — |
| | Heating temperature (° C.) | 130 | 120 | 120 | — | — |
| | Heating time (hours) | 4 | 2 | 1 | — | — |
| Poly(vinyl alcohol) | Degree of saponification (mol %) | 98.1 | 98.1 | 98.1 | 98.1 | 98.2 |
| | Solubility in cold water (%) | 8.8 | 5.9 | 3.9 | — | — |
| | Degree of swelling | 3.3 | 3.2 | 2.8 | — | — |

The invention claimed is:

1. A production method for a poly(vinyl alcohol) having a degree of saponification of 97.0 mol % or more, the method comprising:

a pulverization step of pulverizing a first poly(vinyl alcohol) having a particulate form to obtain a second poly(vinyl alcohol) having an adjusted particle size; and a heating step of heating the second poly(vinyl alcohol), wherein the second poly(vinyl alcohol) is heated after at least one of an alcohol and water is adhered to a surface of the second poly(vinyl alcohol);

wherein, in the pulverization step, the first poly(vinyl alcohol) is pulverized such that a proportion of a poly(vinyl alcohol) having a particle diameter of 53 μm or less in the second poly(vinyl alcohol) is 50 mass % or less and a proportion of a poly(vinyl alcohol) having a particle diameter of 180 μm or more in the second poly(vinyl alcohol) is 5 mass % or less.

2. The production method according to claim 1, wherein, in the heating step, the second poly(vinyl alcohol) is heated after an alcohol and water are adhered to a surface of the second poly(vinyl alcohol).

3. The production method according to claim 1, wherein the poly(vinyl alcohol) having a degree of saponification of 97.0 mol % or more has a solubility in cold water of 10.0% or less and a degree of swelling of 5.0 or less.

4. The production method according to claim 1, wherein the poly(vinyl alcohol) having a degree of saponification of 97.0 mol % or more is utilized as a binder for glass paper.

5. The production method according to claim 1, wherein a heating temperature in the heating step is 80° C. or more.

6. The production method according to claim 5, wherein the heating temperature in the heating step is 180° C. or less.

* * * * *